United States Patent [19]

Adams

[11] Patent Number: 5,470,088
[45] Date of Patent: Nov. 28, 1995

[54] BICYCLE TRAILER HITCH ASSEMBLY AND BICYCLE TRAILER INCORPORATING SAME

[76] Inventor: Delbert J. Adams, 286 Meadowcrest Rd., Kingston, Ontario, Canada, K7M 3S3

[21] Appl. No.: 162,330

[22] Filed: Dec. 7, 1993

[51] Int. Cl.⁶ .............................. B62K 27/12; B60D 1/14
[52] U.S. Cl. ........................ 280/204; 280/292; 280/492; 403/59; 24/279
[58] Field of Search .................................. 280/204, 231, 280/239, 292, 492, 494; 403/59, 53, 58; 24/279, 270, 274 WB

[56] References Cited

U.S. PATENT DOCUMENTS

| | | | |
|---|---|---|---|
| 3,050,762 | 8/1962 | Ballinger | 403/58 X |
| 3,653,679 | 4/1972 | Howard | 280/204 |
| 3,787,065 | 1/1974 | Grimm | 280/204 |
| 3,877,723 | 4/1975 | Fahey et al. | 280/204 |
| 3,934,666 | 1/1976 | Ellington | 180/11 |
| 4,365,393 | 12/1982 | Hauffe et al. | 24/279 |
| 4,371,184 | 2/1983 | Henden et al. | 280/204 |
| 4,413,835 | 11/1983 | Hazelett | 280/204 |
| 4,458,908 | 7/1984 | Strong | 280/239 |
| 4,548,423 | 10/1985 | Craven | 280/204 X |
| 4,756,541 | 7/1988 | Albitre | 280/204 |
| 4,928,985 | 5/1990 | Nowlin | 280/204 |
| 5,067,738 | 11/1991 | O'Conner | 280/204 |
| 5,076,600 | 12/1991 | Fake | 280/204 |
| 5,259,634 | 11/1993 | Berner et al. | 280/204 |
| 5,269,548 | 12/1993 | Milligan | 280/204 |

FOREIGN PATENT DOCUMENTS

| | | |
|---|---|---|
| 51516 | 2/1896 | Canada . |
| 1235435 | 12/1986 | Canada . |
| 72409 | 4/1993 | Canada . |
| 2053546 | 4/1993 | Canada ............ B62D 63/06 |
| 0847658 | 10/1939 | France ................. 280/204 |
| 0050089 | 11/1939 | France ................. 280/204 |
| 968629 | 12/1950 | France . |
| 811077 | 7/1949 | Germany . |
| 185820 | 11/1936 | Switzerland . |

OTHER PUBLICATIONS

*New Cyclist* No. 8, Winter 1989/90 at page 15 article "Three wheels on Your Wagon" by Jim McGurn.
"More Ideas on Family Riding" letter by Sheila Simpson, published in 1977.
Trailerbikes, brochure, publication date unknown.
*American Bicyclist Motorcyclist*, Mar. 1992, p. 25, 3rd wheel bicycle trailer.

*Primary Examiner*—Margaret A. Focarino
*Assistant Examiner*—F. Zeender
*Attorney, Agent, or Firm*—Thomas Adams

[57] ABSTRACT

A bicycle trailer comprises a frame having at its one end a hitch assembly for connecting the bicycle trailer to a towing bicycle and at its other end a ground-engagable wheel. The hitch assembly comprises a clamp part for clamping non-rotatably to a seat supporting part, for example the seat post, of the towing bicycle, a universal joint portion fixedly attached to the trailer frame and a releasable fastening attaching the clamp part to the universal joint portion. The universal joint portion permits pivoting of the trailer, in use, about generally vertical and horizontal axes which are spaced apart, preferably with the second pivot axis between the first pivot axis and the trailer frame. The clamp part may comprise a generally U-shaped member having a cylindrical bight portion and a bolt member extending through aligned holes in end portions of the U-shaped member to urge them together and clamp the seat supporting part. The holes may provide clearance for the bolt member as the end portions rotate relative to the bolt member during tightening of the bolt member. The end portions may take the form of cylinders with a cylindrical insert in each of the cylinders. The bolt member then extends through both inserts. The hole in one of the cylinders is oversized to provide clearance for the bolt member during rotation of the insert about its axis as the bolt member is tightened. The releasable fastening may comprise a non-rotatable spigot-and socket connection between the clamp member and the universal coupling portion, and retainer for retaining the spigot in the socket.

17 Claims, 3 Drawing Sheets

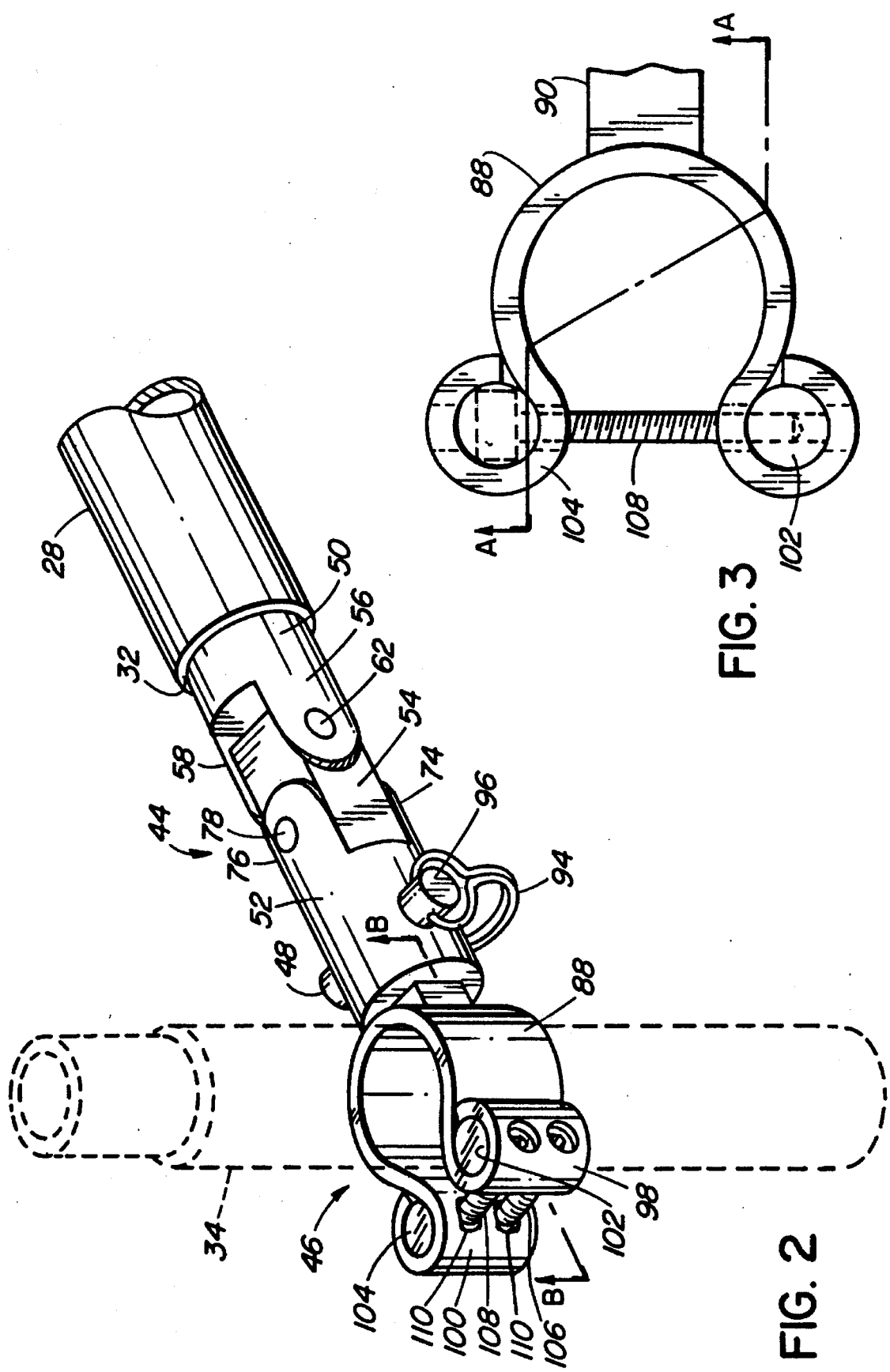

BICYCLE TRAILER HITCH ASSEMBLY AND BICYCLE TRAILER INCORPORATING SAME

DESCRIPTION

1. Technical Field

The invention relates to bicycle trailer hitch assemblies and is applicable to bicycle trailers comprising a frame which, in use, is supported at the rear end by at least one ground-engaging wheel and at the front end by a seat supporting member of a towing bicycle. The invention is especially, but not exclusively, applicable to bicycle trailers which are powered by one or more occupants.

2. Background Art

Examples of such bicycle trailers are disclosed in U.S. Pat. No. 5,067,738 issued Nov. 26, 1991 to Richard J. O'Connor and in my own laid-open Canadian patent application number 2,053,546, both of which documents are incorporated herein by reference. The front end of the bicycle trailer of U.S. Pat. No. 5,067,738 is attached to the seat post of the towing bicycle by means of a U-shaped hitch plate which encircles the seat post. The front end of the trailer frame has a flat segment which fits between the limbs of the U-shaped hitch plate and is secured by a bolt. Pivoting of the trailer vertically relative to the seat post is permitted by rotation of the segment about the bolt and pivoting horizontally is permitted by rotation of the U-shaped hitch plate directly about the seat post. A disadvantage of such a hitch arrangement is that pivoting of the U-shaped member may damage the seat post, especially where the seat post is of aluminium alloy.

The hitch assembly disclosed in my Canadian application number 2,053,546 avoids damage to the seat post by using ball-bearings. This is not entirely satisfactory, however, because of the cost involved.

It is desirable for the bicycle trailer to be removable easily, preferably without tools, when the conventional towing bicycle is to be used alone. It is also desirable for the hitch assembly to accommodate different sizes of seat post so that the bicycle trailer might be towed by different bicycles. This might arise where different members of a family share the bicycle trailer or where the bicycle trailer is rented for short-term use.

An object of the present invention is to eliminate or at lest mitigate one or more of these disadvantages and provide an improved bicycle trailer hitch assembly.

DISCLOSURE OF INVENTION

According to one aspect of the present invention there is provided a bicycle trailer comprising a frame having at its one end a hitch assembly for connecting the bicycle trailer to a towing bicycle and at its other end a ground-engagable wheel, the hitch assembly comprising clamp means for clamping non-rotatably to a seat supporting part, for example the seat post, of the towing bicycle, a universal joint portion fixedly attached to the trailer frame and having first and second pivot axes permitting pivoting of the trailer, in use, about generally vertical and horizontal axes, respectively, the first and second pivot axes being spaced apart, and fastening means releasably attaching the clamp means to the universal joint portion.

According to a second aspect of the invention there is provided a hitch assembly for attaching a bicycle trailer to a towing bicycle, the bicycle trailer having a frame with means for attachment of the hitch assembly at its one end and at its other end a ground-engagable wheel. The hitch assembly comprises clamp means for clamping non-rotatably to a seat supporting part of the towing bicycle; a universal joint portion fixedly attached to the trailer frame and having first and second pivot axes permitting pivoting of the trailer, in use, about generally vertical and horizontal axes, respectively, the first and second pivot axes being spaced apart; and releasable fastening means releasably fastening the clamp means to the universal joint portion.

In embodiments of either aspect of the invention, the second pivot axis preferably is located between the first pivot axis and the trailer frame.

The clamp means may comprise a generally U-shaped member having a bight portion in the form of a cylindrical section and spaced end portions, with a bolt member extending through aligned holes in the end portions to urge them together and flex the U-shaped member into clamping engagement with the seat supporting part. At least one of the holes may provide clearance for the bolt member as the end portions rotate relative to the bolt member during tightening of the bolt member.

In preferred embodiments of either aspect of the invention, the end portions form cylinders having their cylindrical axes parallel to each other and a cylindrical axis of the bight portion, a cylindrical insert member in each of the cylinders. The cylinders and the insert members having aligned holes and the bolt member extending through the aligned holes to urge the end portions together. One of the insert members accommodates a head of the bolt member and the other of the insert members has a screwthreaded hole for engaging the screwthreaded end of the bolt member. The hole in one of the cylinders is oversized to provide clearance for the bolt member during rotation of the insert member about its axis as the bolt member is tightened.

The pivot pins may advantageously each be a clearance fit in the corresponding hole of the pivot block and an interference fit in at least one of the corresponding holes in the bifurcations.

The fastening means may comprise a non-rotatable spigot-and socket connection between the clamp member and the universal coupling portion, and retaining means for retaining the spigot in the socket.

BRIEF DESCRIPTION OF DRAWINGS

FIG. 2 is a perspective view of a hitch assembly for attaching the bicycle trailer to the seat post;

FIG. 3 is a plan view of a seat post clamp portion of the hitch;

BEST MODE(S) FOR CARRYING OUT THE INVENTION

Figure 1:
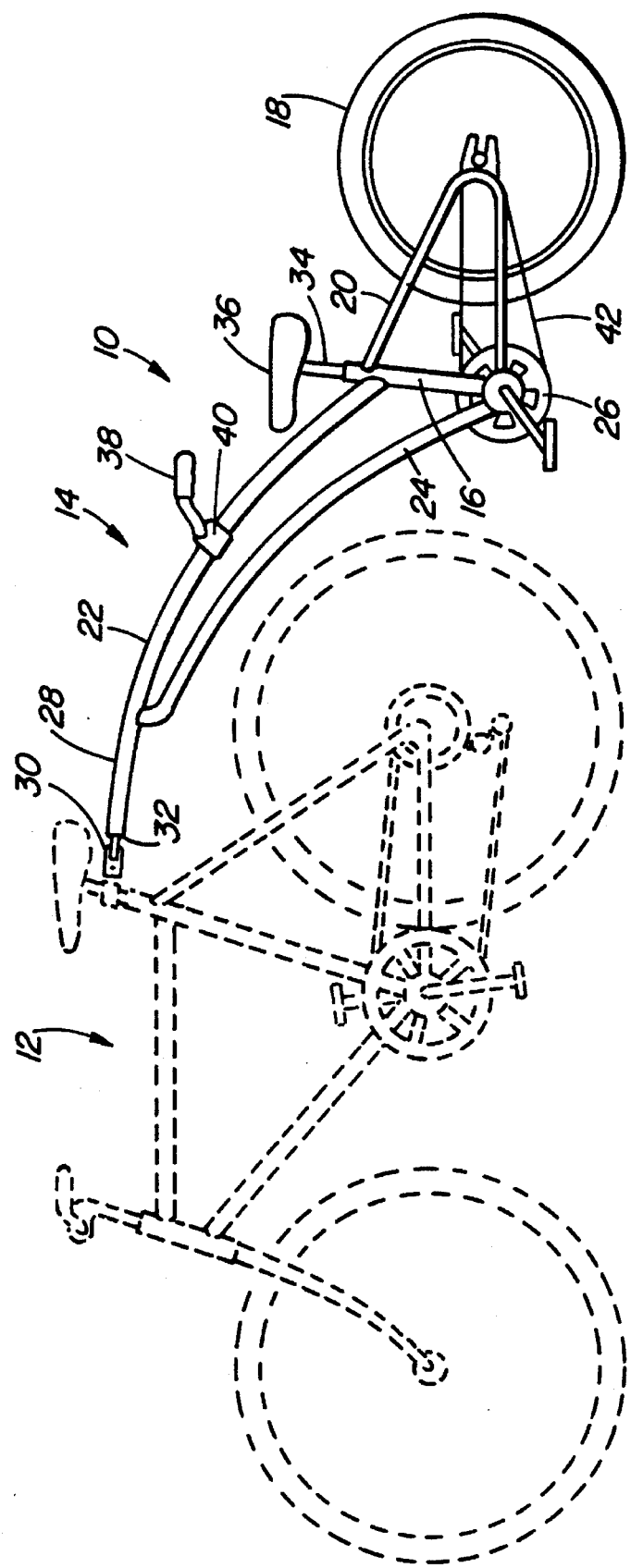
FIG. 1 is a side elevational view of a bicycle trailer hitched to the seat post of a conventional towing bicycle, the latter shown in broken lines.

Referring to FIG. 1, a bicycle trailer 10 is shown coupled to a conventional bicycle 12. The bicycle trailer 10 includes a main frame 14 of welded tubular members. This main frame 14 includes a generally upright seat post support 16 with the trailer wheel 18 being rotatably mounted to frame members 20 which extend rearwardly of the seat post support 16. A crossbar 22 has one end welded to an upper end portion of the seat post support 16 and extends forwards from it, arching upwards. A brace 24 is welded at one end to the crossbar 22 near to its distal end and extends downwardly and rearwardly from the crossbar 22 to stabilize the crossbar. The lower end of seat post support 16 and the lower end of brace 24 are both welded to a bottom bracket housing (not shown) which rotatably mounts a conventional crank wheel assembly 26.

The crossbar 22 has a forwardly directed extension 28 projecting beyond the end of brace 24. A hitch assembly 30, to be described in detail hereafter, is secured to distal end 32 of the extension 28 and connects it to the bicycle 12. This hitch assembly 30 provides freedom of movement of the bicycle 12 and trailer 10 relative to one another about mutually transverse pitch and yaw axes.

A seat post 34 projects upwardly from the seat post support 16 and supports a conventional bicycle seat 36. A handle bar 38 is secured to the crossbar 22 by way of a handle bar mounting bracket 40. The mounting bracket 40 is in the form of a clamp which, when loosened, allows the mounting bracket 40 to be slid toward and away from the seat 36 to accommodate differently sized riders. As illustrated in FIG. 1, when the trailer 10 is attached to the towing bicycle 12, the crossbar 22 arches upwardly and forwardly from the seat post support 16. Hence, as the handlebar 40 mount is moved away from the seat post, the handlebar 38 is automatically raised thereby accommodating larger riders on the trailer. The seat 36 can of course be raised and lowered in conventional fashion to accommodate larger or smaller riders.

The crank wheel assembly 26 is drivingly connected to the conventional cycle wheel 18 by a chain 42 and freewheel sprocket (not shown). The chain drive assembly may be provided with a conventional gear change mechanism.

Figure 4:
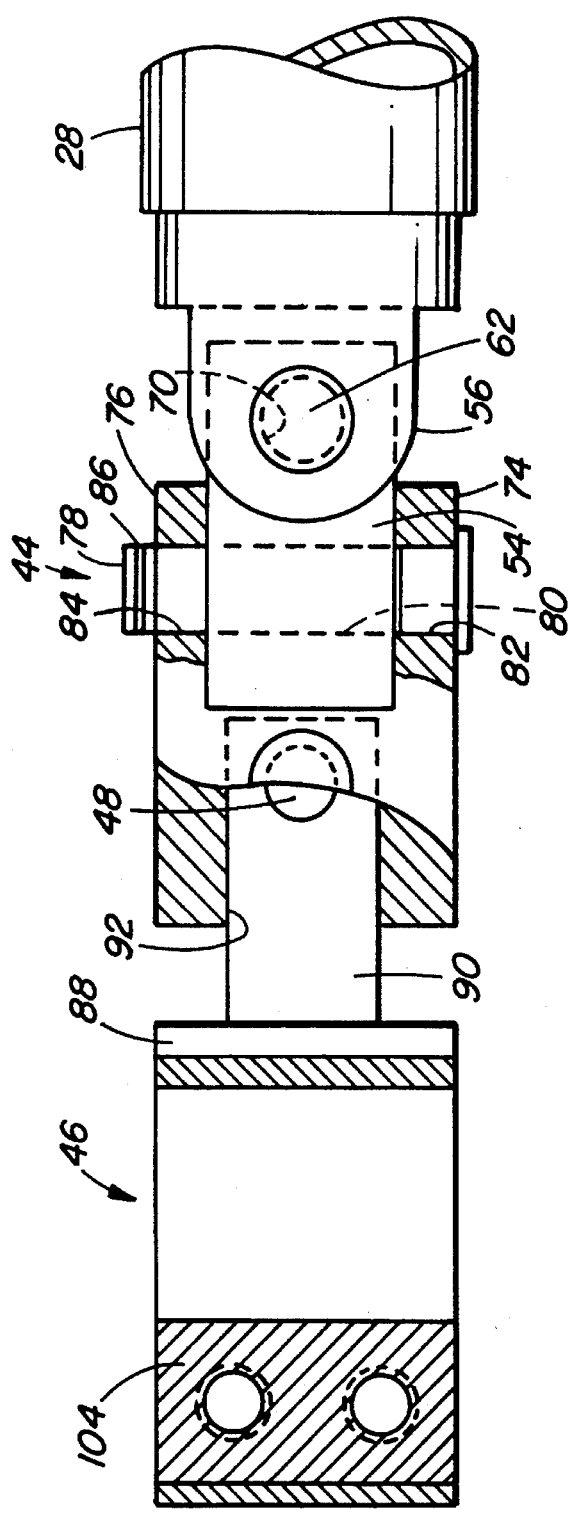
FIG. 4 is a partial sectional side elevational view of the hitch assembly taken on the line A—A of FIG. 4.

The hitch assembly 32 is shown in more detail in FIGS. 2 to 5B. As shown in FIGS. 2 and 4, the hitch assembly 32 comprises a universal coupling part 44 and a seat-post clamp part 46 releasably secured together by retaining means in the form of a dowel pin 48. The universal coupling part 44 comprises two cylindrical members 50 and 52 coupled together by a steel pivot block 54 of rectangular cross-section. The member 50 protrudes from the end portion 28 of crossbar 22 and is fixedly secured to it, for example by welding. The protruding end of the member 50 is bifurcated, forming spaced arms 56 and 58 defining a rectangular slot 60 which receives one end of the pivot block 54. The pivot block 54 is retained by a pivot pin 62 which extends through aligned holes in the arms 56 and 58, respectively, and is secured by a circlip (not shown). The pivot pin 62 extends through a clearance hole 70 in the pivot block 54, allowing the block 52 to pivot about the pivot pin 62 which, in use, will be generally horizontal.

The opposed end of cylindrical member 50 is similarly bifurcated, forming a rectangular slot 72 between two arms 74 and 76. The other end of pivot block 54 is pivotally coupled between the arms 74 and 76 by a second pivot pin 78 which extends through a second clearance hole 80 in pivot block 54 and aligned holes 82 and 84 in the arms 74 and 76 and is secured by a circlip 86. The second pivot pin 78 extends at right angles to the first pivot pin 62. Consequently, the pivot block 54 and the trailer frame crossbar 22 pivot about the axis of pivot pin 78 which, in use, is generally vertical. The ends of the arms 56, 58 and 74, 76 are all rounded to provide clearance as they pivot.

The pivot pin 62 is an interference fit in the holes in arms 56 and 58 but is a clearance fit within the hole 70 in pivot block 54. Likewise the pivot pin 78 is an interference fit in holes 82 and 84 of arms 74 and 76 but a clearance fit in hole 80 of the pivot block 54. Consequently, the pivoting movement is provided by rotation of the pivot pins 62 and 78 within the pivot block 54. This enables the universal coupling to be refurbished, when worn, simply by replacing the pivot block 54 and pivot pins 52 and 78.

Referring also to FIG. 3, the seat post clamp portion 46 comprises a generally U-shaped member having a cylindrical bight portion 88 which embraces the seat post 34 (shown in broken lines in FIG. 2). A spigot 90 of cross-section welded to the middle of bight portion 88 extends into a square cross-section socket 92 in the end of member 52 and is retained by the retaining pin 48. A spring clip 94 attached to the head 96 of pin 48 extends around the member 52 and hooks over the protruding opposite end of the pin 48 to prevent its removal, for example by vibration.

The U-shaped member comprises a steel strip rolled so that the end portions of cylindrical bight portion 88 are formed into cylindrical sockets 98 and 100, which house cylindrical inserts 102 and 104, respectively. Two bolts 106 and 108 extend through holes in the inserts 102 and 104 to connect them together. The heads of the bolts are accommodated in recessed holes in the insert 102 and the screw threaded ends of the bolts engage in correspondingly threaded holes in the insert 104. The heads of the bolts have sockets to receive an Allen wrench to tighten the bolts and urge the inserts together, thereby clamping the seat post.

Figure 5B:
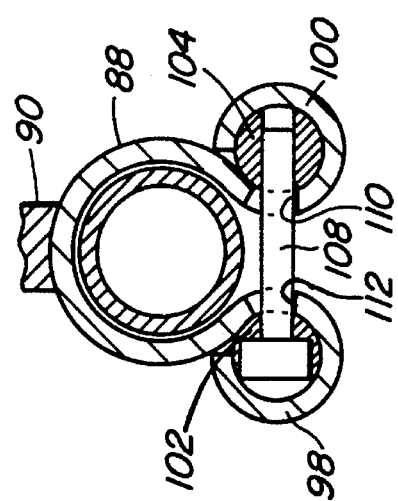
FIGS. 5A and 5B are cross-sectional views on the line B—B of the clamp portion fitted to different sizes of seat post.
Figure 5A:
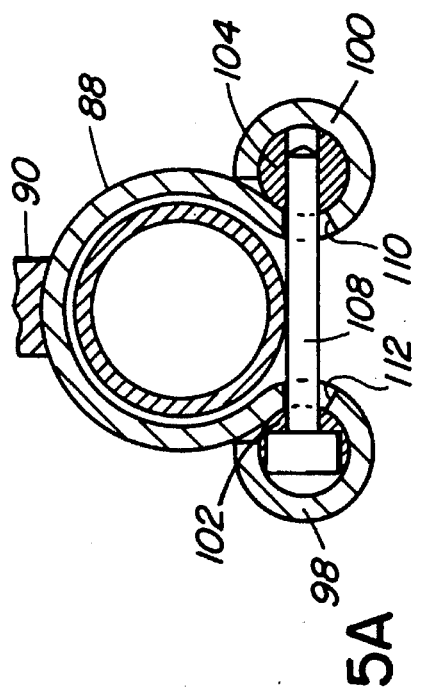

Referring now to FIGS. 5A and 5B, the bolts 106 and 108 extend through holes 110 and 112 in the opposed inwardly facing portions of cylindrical sockets 98 and 100 respectively. The holes 110 and 112 are elongated in the direction perpendicular to the axis of the seat post 34. Such elongation of holes 110 and 112 allows for rotation of the cylindrical socket sections 98 and 100 about their respective axes as the clamp is tightened without the edges of the holes fouling upon the bolts 106 and 108 and causing them to seize or bend. Thus, FIG. 5A shows the clamp fastened to a larger diameter seat post, say about 30mm diameter, in which case the cylindrical socket sections 98 and 100 are wide apart. FIG. 5B shows the clamp fastened to a thinner seat post, say about 25 mm diameter. In this case, the cylindrical socket sections 98 and 100 are much closer together and have rotated inwards about their axes. In both cases, however, the elongated holes 110 and 112 provide clearance for the bolts 106 and 108.

In order to adapt the towing bicycle 12 for hitching to a trailer, the seat post 34 is removed, the clamp portion 46 installed onto it, and the seat post 34 replaced. To hitch the bicycle trailer 10 to the bicycle 12 simply requires the universal coupling portion 44, which is permanently secured to the trailer frame extension 28, to be slid onto square spigot 90 and the pin 48 inserted to retain it.

It is preferred to have the vertical pivot axis closer to the seat post 34 than the horizontal pivot axis, especially with the spacing between the axes of pivot pins 62 and 78 about equal to the width of the pivot block 54. This has been found to reduce the likelihood of the trailer falling over when the towing bicycle turns sharply.

The bolts 106 and 108 and inserts 102 and 104 may be of high tensile steel to allow considerable clamping force and so ensure no rotation of the clamp about the seat post 34. The cylindrical bight portion 88, however, may be relatively flexible allowing it to conform closely to the seat post 34.

It is envisaged that the clamp portion might be made of other, non-metallic material, for example synthetic plastics material. The spigot 90, however, would generally need to be relatively tough to tolerate the torque and shear forces, so metal is preferred.

Although, as described, the seat post clamp portion is formed by rolling a strip, it will be appreciated that other forms of construction are possible, such as forging or die casting.

While a preferred embodiment of the invention has been describe by way of example, those skilled in this field will realise that numerous modifications and changes may be made while still remaining within the scope of the invention. Accordingly, the invention is not to be limited to the specific embodiment described but is to include all modifications and variations as fall within the scope of the accompanying claims.

I claim:

1. A bicycle trailer comprising a frame having at its one end a hitch assembly for connecting the bicycle trailer to a towing bicycle and at its other end a ground-engagable wheel, the hitch assembly comprising;

a clamp for clamping non-rotatably to a seat supporting part of the towing bicycle;

a universal coupling comprising a first part having bifurcations and a second part having bifurcations, the first part and second part being connected together by a central pivot block, the pivot block having one end portion extending between the bifurcations of the first part, its other end portion extending between the bifurcations of the second part, a first hole through said one end portion and a second hole through said other end portion, a first pivot pin extending through aligned holes in the bifurcations of the first part and said first hole to provide a first pivot axis and a second pivot pin extending through aligned holes in the bifurcations of the second part and said second hole to provide a second pivot axis, the first part being attached non-rotatably to the clamp and pivoting about said first pivot axis relative to the block, the second part being attached non-rotatably to the trailer frame and pivoting relative to the block about said second pivot axis, the first pivot axis and second pivot axis being perpendicular to each other and permitting pivoting of the trailer, in use, about generally vertical and horizontal axes, respectively, the first and second pivot axes being spaced apart with the first pivot axis disposed between the clamp and the second pivot axis; and releasable fastening means releasably attaching the clamp to the universal coupling.

2. A bicycle trailer as claimed in claim 1, wherein the clamp comprises a generally U-shaped member having a bight portion in the form of a cylindrical section and spaced end portions, each of the end portions having at least one through hole, the through holes being aligned with each other, at least one bolt member extending through the holes to urge the end portions together and flex the U-shaped member into clamping engagement with the seat supporting part, at least one of the holes providing clearance for the bolt member as the end portions rotate relative to the bolt member during tightening of the bolt member.

3. A bicycle trailer as claimed in claim 1, wherein the clamp comprises a generally U-shaped member having a bight portion in the form of a cylindrical section and spaced end portions, respective end portions forming cylinders having their cylindrical axes parallel to each other and a cylindrical axis of the bight portion, a cylindrical insert member in each of the cylinders, each of the cylinders and each of the insert members having a through hole, the holes being aligned, a bolt member extending through the aligned holes to urge the end portions together and flex the bight portion into clamping engagement with the seat supporting part, one of the insert members accommodating a head of the bolt member and the other of the insert members having its hole screwthreaded for engaging a corresponding screwthreaded end of the bolt member, at least one of the holes in the cylinders being sized to provide clearance for the bolt member during rotation of the insert member about its axis as the bolt member is tightened.

4. A bicycle trailer as claimed in claim 1, wherein the pivot pins are each a clearance fit in the corresponding hole of the pivot block and an interference fit in at least one of the corresponding holes in the bifurcations.

5. A bicycle trailer as claimed in claim 1, wherein the releasable fastening means comprises a spigot-and-socket connection between the clamp and the universal coupling portion, and a retainer retaining the spigot in the socket.

6. A bicycle trailer as claimed in claim 1 wherein the fastening means comprises a spigot protruding from the clamp, a socket in the universal coupling to receive the spigot, and retaining means for retaining the spigot in the socket.

7. A bicycle trailer as claimed in claim 1, wherein the clamp comprises a generally U-shaped member having a bight portion in the form of a cylindrical section and spaced end portions, each of the end portions having at least one through hole, the through holes being aligned with each other, at least one bolt member extending through the holes to urge the end portions together and flex the U-shaped member into clamping engagement with the seat supporting part, at least one of the holes providing clearance for the bolt as the end portions rotate relative to the bolt member as the bolt member is tightened, and the fastening means comprises a non-rotatable spigot-and socket connection between the bight portion and the universal coupling, and retaining means for retaining the spigot in the socket.

8. A hitch assembly for attaching a bicycle trailer to a towing bicycle, the bicycle trailer having a frame with means for attachment of the hitch assembly at its one end and at its other end a ground-engagable wheel, the hitch assembly comprising;

a clamp for clamping non-rotatably to a seat supporting part of the towing bicycle;

a universal coupling comprising a first part having bifurcations and a second part having bifurcations, the first part and second part being connected together by a central pivot block, the pivot block having one end portion extending between the bifurcations of the first part, its other end portion extending between the bifurcations of the second part, a first hole through said one end portion and a second hole through said other end portion, a first pivot pin extending through aligned holes in the bifurcations of the first part and said first hole to provide a first pivot axis and a second pivot pin extending through aligned holes in the bifurcations of the second part and said second hole to provide a second pivot axis, the first part being attached non-rotatably to the clamp and pivoting about said first pivot axis relative to the block, the second part being attachable non-rotatably to the trailer frame and pivoting about said second pivot axis, the first pivot axis and second pivot axis being perpendicular to each other and permitting pivoting of the trailer, in use, about generally vertical and horizontal axes, respectively, the first and second pivot axes being spaced apart with the first pivot axis disposed between the clamp and the second pivot axis; and releasable fastening means releasably attaching the clamp means to the universal coupling.

9. A hitch assembly as claimed in claim 8, wherein the clamp comprises a generally U-shaped member having a bight portion in the form of a cylindrical section and spaced end portions, each of the end portions having at least one through hole, the through holes being aligned with each other, at least one bolt member extending through the aligned holes to urge the end portions together and flex the U-shaped member into clamping engagement with the seat supporting part, at least one of the holes providing clearance for the bolt member as the end portions rotate relative to the bolt member during tightening of the bolt member.

10. A hitch assembly as claimed in claim 8, wherein the clamp comprises a generally U-shaped member having a bight portion in the form of a cylindrical section and spaced end portions, respective end portions forming cylinders having their cylindrical axes parallel to each other and a cylindrical axis of the bight portion, a cylindrical insert member in each of the cylinders, each of the cylinders and each of the insert members having a through hole, the holes being aligned, a bolt member extending through the aligned holes to urge the end portions together and flex the bight portion into clamping engagement with the seat supporting part, one of the insert members accommodating a head of the bolt member and the other of the insert members having its hole screwthreaded for engaging a correspondingly screwthreaded end of the bolt member, at least one of the holes in the cylinders being sized to provide clearance for the bolt member during rotation of the insert member about its axis as the bolt member is tightened.

11. A hitch assembly as claimed in claim 8, wherein the universal coupling comprises a said first part having one end fixed to the trailer frame and bifurcations at its other end, a said second part having one end attached to the fastening means and bifurcations at its other end, the pivot block having one end extending between the bifurcations of the first part and its other end between the bifurcations of the second part, a first pivot pin extending through aligned holes in the bifurcations of the first part and a first hole in the pivot block, and a second pivot pin extending through aligned holes in the bifurcations of the second part and a second hole in the pivot block.

12. A hitch assembly as claimed in claim 11, wherein the pivot pins are each a clearance fit in the corresponding hole of the pivot block and an interference fit in at least one of the corresponding holes in the bifurcations.

13. A hitch assembly as claimed in claim 8, wherein the releasable fastening means comprises a spigot-and-socket connection between the clamp and the universal coupling, and a retainer retaining the spigot in the socket.

14. A hitch assembly as claimed in claim 8, wherein the fastening means comprises a spigot protruding from the clamp means, a socket in the universal coupling to receive the spigot, and retaining means for retaining the spigot in the socket.

15. A hitch assembly as claimed in claim 8, wherein the clamp comprises a generally U-shaped member having a bight portion in the form of a cylindrical section and spaced end portions, each of the end portions having at least one through hole, the through holes being aligned with each other, at least one bolt member extending through the aligned holes to urge the end portions together and flex the U-shaped member into clamping engagement with the seat supporting part, at least one of the holes providing clearance for the bolt as the end portions rotate relative to the bolt member as the bolt member is tightened, and the fastening means comprises a non-rotatable spigot-and socket connection between the bight portion and the universal coupling portion, and retaining means for retaining the spigot in the socket.

16. A bicycle trailer comprising a frame having at its one end a hitch assembly for connecting the bicycle trailer to a towing bicycle and at its other end a ground-engagable wheel, the hitch assembly comprising;

a clamp for clamping non-rotatably to a seat supporting part of the towing bicycle;

a universal coupling comprising a first part having bifurcations and a second part having bifurcations, the first part and second part being connected together by a central pivot block, the pivot block having one end portion extending between the bifurcations of the first part, its other end portion extending between the bifurcations of the second part, a first hole through said one end portion and a second hole through said other end portion, a first pivot pin extending through aligned holes in the bifurcations of the first part and said first hole to provide a first pivot axis and a second pivot pin extending through aligned holes in the bifurcations of the second part and said second hole to provide a second pivot axis, the first part being attached non-rotatably to the clamp and pivoting about said first pivot axis relative to the block, the second part being attached non-rotatably to the trailer frame and pivoting relative to the block about said second pivot axis, the first pivot axis and second pivot axis being perpendicular to each other and permitting pivoting of the trailer, in use, about generally vertical and horizontal axes, respectively, the first and second pivot axes being spaced apart with the first pivot axis disposed between the clamp and the second pivot axis.

17. A hitch assembly for attaching a bicycle trailer to a towing bicycle, the bicycle trailer having a frame with means for attachment of the hitch assembly at its one end and at its other end a ground-engagable wheel, the hitch assembly comprising;

a clamp for clamping non-rotatably to a seat supporting part of the towing bicycle;

a universal coupling comprising a first part having bifurcations and a second part having bifurcations, the first part and second part being connected together by a central pivot block, the pivot block having one end portion extending between the bifurcations of the first part, its other end portion extending between the bifurcations of the second part, a first hole through said one end portion and a second hole through said other end portion, a first pivot pin extending through aligned holes in the bifurcations of the first part and said first hole to provide a first pivot axis and a second pivot pin extending through aligned holes in the bifurcations of the second part and said second hole to provide a second pivot axis, the first part being attached non-rotatably to the clamp and pivoting about said first pivot axis relative to the block, the second part being attachable non-rotatably to the trailer frame and pivoting about a second pivot axis, the first pivot axis and second pivot axis being perpendicular to each other and permitting pivoting of the trailer, in use, about generally vertical and horizontal axes, respectively, the first and second pivot axes being spaced apart with the first pivot axis disposed between the clamp and the second pivot axis.

* * * * *

UNITED STATES PATENT AND TRADEMARK OFFICE
CERTIFICATE OF CORRECTION

Page 1 of 3

PATENT NO. : 5,470,088
DATED : November 28, 1995
INVENTOR(S) : Delbert John Adams It is certified that error appears in the above-indentified patent and that said Letters Patent is hereby corrected as shown below:

| | |
|---|---|
| Col. 4, line 4: | After "of" insert --square-- |
| Col. 4, line 67: | Delete "describe" and insert --described-- |
| Col. 5, line 11: | Delete "a seat supporting" |
| Col. 5, line 12: | Delete "part of" |
| Col. 5, line 46: | Delete "the seat supporting" |
| Col. 5, line 47: | After "part" insert --of the towing bicycle-- |
| Col. 5, line 60: | Delete "the seat supporting" |
| Col. 5, line 61: | After "part" insert --of the towing bicycle-- |
| Col. 6, line 19: | Delete "the seat supporting" |
| Col. 6, line 20: | After "part" insert --of the towing bicycle-- |

UNITED STATES PATENT AND TRADEMARK OFFICE
CERTIFICATE OF CORRECTION

PATENT NO. : 5,047,088  
DATED : November 28, 1995  
INVENTOR(S) : Delbert John Adams Page 2 of 3

It is certified that error appears in the above-indentified patent and that said Letters Patent is hereby corrected as shown below:

| | |
|---|---|
| Col. 6, line 31: | Delete "a seat supporting" |
| Col. 6, line 32: | Delete "part of" |
| Col. 6, line 66: | Delete "the seat" |
| Col. 6, line 67: | Delete "supporting" |
| Col. 6, line 67: | After "part" insert --of the towing bicycle-- |
| Col. 7, line 11: | Delete "the seat supporting" |
| Col. 7, line 12: | After "part" insert --of the towing bicycle-- |
| Col. 7, line 51: | Delete "the seat" |
| Col. 7, line 52: | Delete "supporting" |
| Col. 7, line 52: | After "part" insert --of the towing bicycle-- |
| Col. 8, line 1: | Delete "a seat supporting" |
| Col. 8, line 2: | Delete "part of" |

UNITED STATES PATENT AND TRADEMARK OFFICE
CERTIFICATE OF CORRECTION

PATENT NO. : 5,470,088
DATED : November 28, 1995
INVENTOR(S) : Delbert John Adams It is certified that error appears in the above-indentified patent and that said Letters Patent is hereby corrected as shown below:

Col. 8, line 32:     Delete "a seat supporting"

Col. 8, line 33:     Delete "part of"

Signed and Sealed this

Fourth Day of June, 1996

Attest:

BRUCE LEHMAN

*Attesting Officer*     *Commissioner of Patents and Trademarks*